United States Patent
Kritt et al.

(10) Patent No.: US 9,645,713 B2
(45) Date of Patent: May 9, 2017

(54) PATTERN BASED VIDEO FRAME NAVIGATION AID

(71) Applicant: International Business Machines Corporation, Armonk, NY (US)

(72) Inventors: Barry A. Kritt, Raleigh, NC (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 605 days.

(21) Appl. No.: 14/068,323

(22) Filed: Oct. 31, 2013

(65) Prior Publication Data

US 2014/0380160 A1 Dec. 25, 2014

Related U.S. Application Data

(63) Continuation of application No. 13/921,803, filed on Jun. 19, 2013, now abandoned.

(51) Int. Cl.
G06F 17/30 (2006.01)
G06Q 10/10 (2012.01)
G06Q 30/02 (2012.01)
G06F 3/0484 (2013.01)
G11B 27/10 (2006.01)
G11B 27/32 (2006.01)

(52) U.S. Cl.
CPC .......... *G06F 3/0484* (2013.01); *G11B 27/105* (2013.01); *G11B 27/322* (2013.01)

(58) Field of Classification Search
CPC ... G06F 17/30864; G06Q 10/10; G06Q 30/02
USPC ................... 707/736, 749, E17.028
See application file for complete search history.

(56) References Cited

U.S. PATENT DOCUMENTS

| 4,195,317 A | 3/1980 | Stratton |
| 8,132,200 B1 | 3/2012 | Karam |
| 8,176,191 B2* | 5/2012 | Fischer .................. G06Q 50/01 705/319 |
| 8,185,929 B2 | 5/2012 | Cooper et al. |
| 8,942,542 B1* | 1/2015 | Sherrets ........... H04N 21/44008 386/241 |
| 2006/0041902 A1* | 2/2006 | Zigmond ............... H04H 60/31 725/9 |

(Continued)

OTHER PUBLICATIONS

Jung et al., "Efficient Stereo Video Coding Based on Frame Skipping for Real-Time Mobile Applications", IEEE Transactions on Consumer Electronics, Aug. 2008, vol. 54 Issue 3, pp. 1259-1266.

*Primary Examiner* — Mohammad S Rostami
*Assistant Examiner* — Robert F May
(74) *Attorney, Agent, or Firm* — Lieberman & Brandsdorfer, LLC (57) ABSTRACT

Recommending and graphically displaying viewed video data sensitive to the viewing pattern of a user. Responsive to viewing a plurality of video frames of a video file, a navigation profile is captured to document the viewing pattern of the video frames. Specifically, attributes of the video frames are documented such as the frequency of plays of the video frames. Where multiple navigation profiles are captured, the navigation profiles are stored, aggregated, and represented graphically on a display. Additional video may be recommended based on the aggregated data.

9 Claims, 5 Drawing Sheets

(56) References Cited

U.S. PATENT DOCUMENTS

| | | | |
|---|---|---|---|
| 2010/0199295 A1* | 8/2010 | Katpelly | G06F 17/30053 |
| | | | 725/14 |
| 2011/0107369 A1 | 5/2011 | O'Brien et al. | |
| 2011/0194839 A1* | 8/2011 | Gebert | G11B 27/034 |
| | | | 386/290 |
| 2012/0203799 A1 | 8/2012 | Blanchflower et al. | |
| 2012/0237183 A1 | 9/2012 | Chen et al. | |
| 2013/0086509 A1* | 4/2013 | Satyanarayana | G06F 17/3064 |
| | | | 715/781 |
| 2013/0259399 A1* | 10/2013 | Ho | G06F 17/30825 |
| | | | 382/276 |
| 2014/0074866 A1* | 3/2014 | Shah | G06F 17/30817 |
| | | | 707/749 |

* cited by examiner

PATTERN BASED VIDEO FRAME NAVIGATION AID

CROSS REFERENCE TO RELATED APPLICATION(S)

This application is a continuation patent application claiming the benefit of the filing date of U.S. patent application Ser. No. 13/921,803 filed on Jun. 19, 2013 and titled "Pattern Based Video Frame Navigation Aid" now pending, which is hereby incorporated by reference.

BACKGROUND

Technical Field

The present invention relates generally to capturing data associated with an access file. More specifically, the invention relates to detecting a pattern of the accessed file, and capturing the pattern in the form of a navigation profile.

Background

With the development of technology and electronic storage devices, data in various form is generally stored in some form of an electronic storage device. Examples of such data include image data, such as still images and video. Data pertaining to viewing of such files may be tracked and/or recorded. In one embodiment, the captured data can be used to determine the popularity of the file, demographics associated with viewers of the file, and/or recommendations to viewers for viewing the file.

Data files however, are not always viewed in their entirety. For example, a video file may be watched non-continuously and select segments of the file may be skipped while other segments may be viewed more than one time. Accordingly, there is a macroscopic manner in tracking file access, and there is a microscopic manner of ascertaining file access on a segment basis.

SUMMARY OF THE INVENTION

This invention comprises a method for capturing a navigation profile of a viewed data file and use of the captured profile.

In one aspect, a method is provided for navigating through patterns of a viewed data file. Viewed portions of the file are captured, and a navigation profile of the portions is formed. The captured navigation profile includes a pattern of select portions of the data file that have been viewed and at least one select portion of the file that has been omitted from viewing. The captured navigation profile is stored and a portion of the stored file is selected for a second viewing, with the second viewing based on the captured and stored navigation profile.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, modules, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

Figure 1:
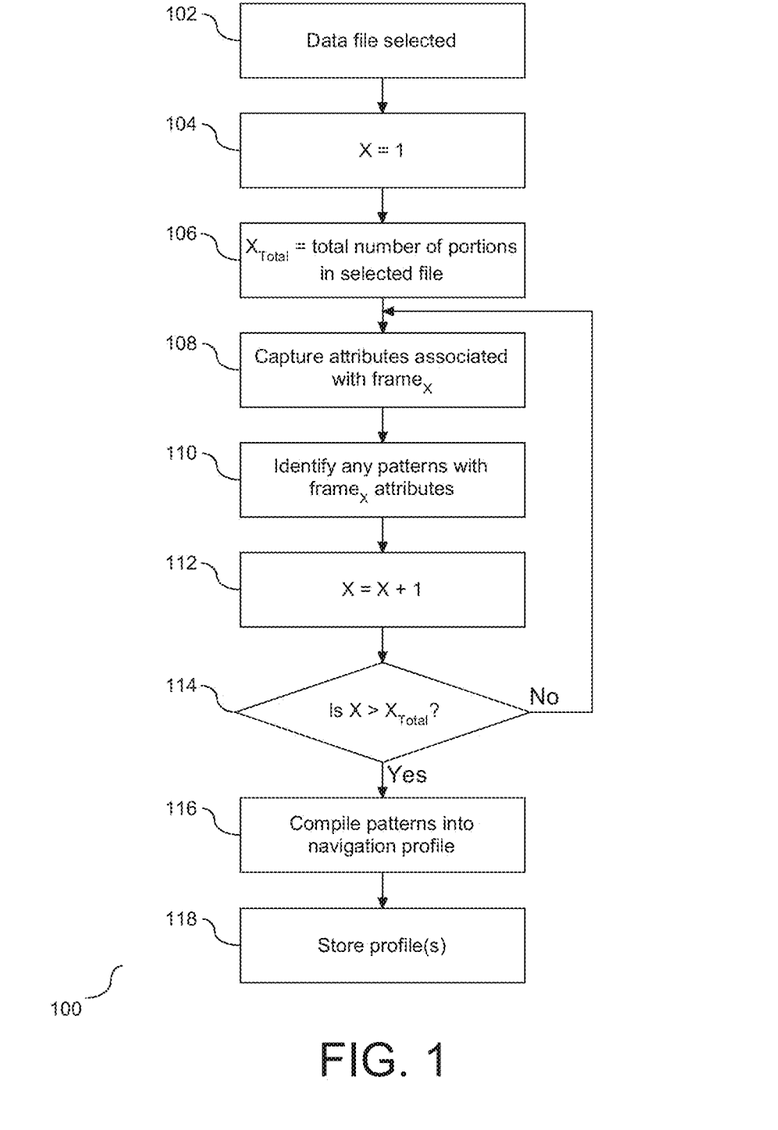
FIG. 1 is a flow chart illustrating a method for creating a navigation profile for viewed data file.

Data files come in different forms, including but not limited to an image format and a video format. Regardless of the format, the file is comprised of an aggregation of data. When the file is opened or otherwise accessed, different sections of the data aggregation may be selected and/or viewed. To determine detailed aspects of an accessed file, a navigation profile is created based on a summary of data pertaining accessed portions of the file. FIG. 1 is a flow chart (100) illustrating a method for creating the profile. A file is selected (102) and a counting variable X is initialized (104). The counting variable represents portions of the file. In one embodiment, portions may include but are not limited to segments, bytes, bits, ranges, etc. In one embodiment, the file is a video file and the counting variable pertains to individual frames that comprise the video. The variable $X_{total}$ is assigned to the total number of portions in the selected file (106). For ease of description, the file being described is a video file and the individual portions are individual frames of the video file. One or more attributes associated with a selected frame, $frame_x$, are captured (108). These attributes may include whether $frame_x$ was subject to viewing or omitted from viewing. In one embodiment, $frame_x$ has an audio attribute capturing the decibel level in which $frame_x$ was viewed. Similarly, in one embodiment, $frame_x$ has a speed attribute capturing the speed in which select frames were viewed. Accordingly, for each selected frame of the file, attribute data associated with the selection is collected.

A pattern associated with the collected attribute data may be formed from one or more selections of the file. Following the selected access of a data file, any pattern(s) associated with the captured attributes are identified (110). Examples of such patterns include, but are not limited to, a collection of selected portions having the greatest number of accesses or least number of accesses, and a collection of selected portions that were viewed at an increased viewing speed and/or volume etc. Following the capturing of attributes at step (108) and the pattern identification at step (110), the counting variable X is incremented (112). It is then determined if all of the portions of the selected file have been assessed (114). A negative response to the determination at step (114) is followed by a return to step (108). Conversely, a positive response to the determination at step (114) is following by evaluating the captured data. More specifically, the patterns are compiled into a navigation profile (116); the profile is a collection of the acquired attributes of the individual frames of the file. The navigation profile(s) is stored in an electronic storage device (118). Accordingly, individual frames of a video are separately assessed for attributes, and the collected attributes are summarized in a navigation profile identifying any associated attribute patterns.

Figure 2:
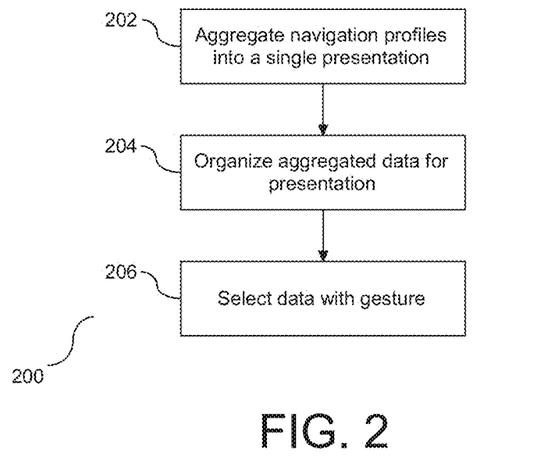
FIG. 2 is a flow chart illustrating a method for graphically representing the navigation profile(s).

The attributes of individual frames in the data file are compiled into a navigation profile as described in FIG. 1. FIG. 2 is a flow chart (200) illustrating a method for representing the navigation profile for a select file. The navigation profile is an aggregation of one or more file accesses and frame selections. In one embodiment, multiple selections are compiled into a single navigation profile. Similarly, in one embodiment, the navigation profile is unique to a viewing pattern of a user, and the compilation of multiple navigation profiles is a joining of the viewing patterns of various users into a single combined view. In one embodiment, multiple navigation profiles are compiled such that the attribute data of two or more viewing navigation profiles are aggregated into a single presentation (202). The aggregated data is organized for presentation (204). Examples of the presentation include, but are not limited to, a histogram, a bar graph, and a line graph. Accordingly, file access and frame selections are aggregated and graphically represented in a compilation to form a navigation profile.

The amount of information presented by the navigation profiles may be too great to reasonably represent graphically on a single display. Therefore, identified patterns within the graphical display may be limited to select portions of the data to support ease of navigation. For example, the graphical representation may display the data associated with every frame of the video, or only a select portion of the frames. In one embodiment, the navigation profile is available on visual display and includes an interactive mode wherein a portion of data represented in the profile may be selected in response to a gesture, such as in a finger gesture or a stylus on a touch sensitive display (206). In one embodiment, a select portion of the displayed data may be expanded with the gesture. In one embodiment, the magnitude of expansion is proportional to the distance of movement created by the gesture. In another embodiment, gesture(s) may be used to navigate between selected portions of displayed data, or between specific attributes associated with the frames. For example, a gesture may be used to navigate between a graphical representation of volume with respect to a frame number and a graphical representation of the quantity of frames viewed with respect to a frame number. Accordingly, on a graphical display, the navigation profiles can be effectively displayed and manipulated through selected portions.

Figure 3:
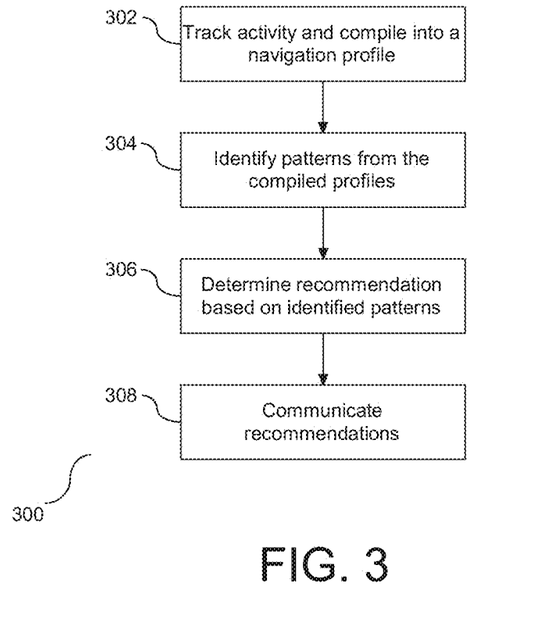
FIG. 3 is a flow chart illustrating a method for autonomous data file recommendation.

Navigation profiles are generated and stored sensitive to a viewing pattern as described in FIG. 1. With these navigation profiles, a file can be autonomously recommended based on previous navigation of the profiles. FIG. 3 is a flow chart (300) illustrating a method for autonomous recommendation of one or more files. Activity associated with a file is tracked and compiled into a navigation profile (302), and patterns are identified from the compiled navigation profiles (304). Recommendations are determined based on the identified patterns (306), followed by communicating the recommendation of one or more portions of the data file (308). For example, a prior pattern assessment may yield recommendation of select frames for viewing. In one embodiment, where the data file is a video, if identified patterns show a high view rate for action scenes in the video, videos with action scenes may be recommended or portions of the video containing action scenes may be recommended. In one embodiment, recommendations may employ characteristics of a profile. For example, file portions containing highly viewed frames may be recommended from navigation profiles of other users who share a similar profile characteristic. Accordingly, data files are recommended based on various qualifiers, including acquired viewing patterns sensitive to frame rates and their associated attributes.

Figure 4A:
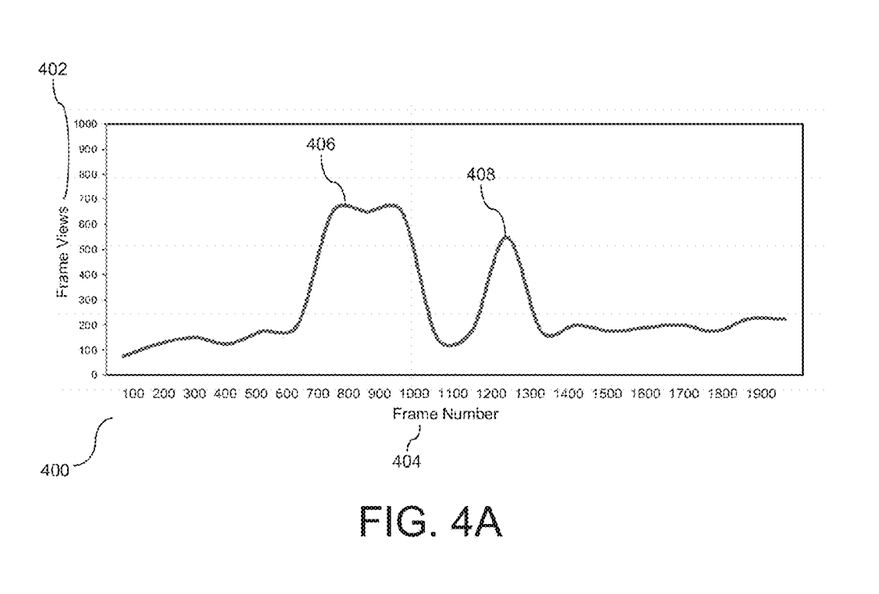
FIGS. 4A and 4B are block diagrams illustrating examples of graphical representations of viewed files and associated captured view patterns.
Figure 4B:
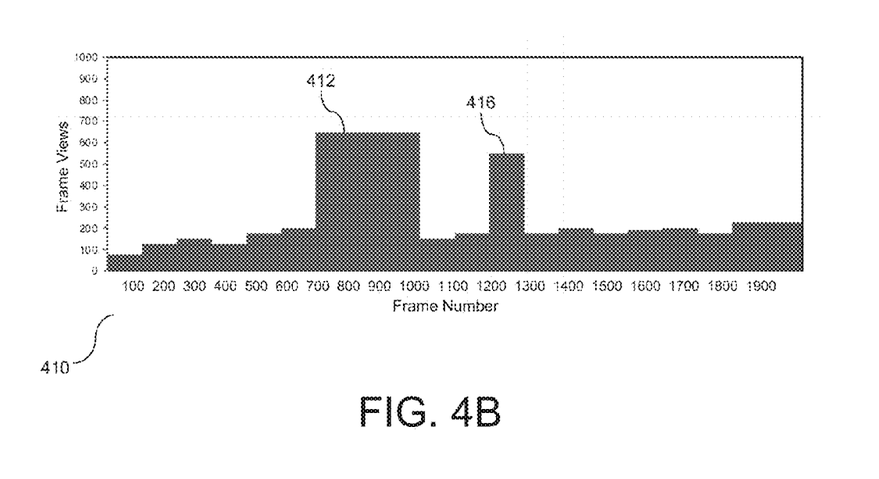

As shown and described in FIG. 2, the navigation profiles are graphically represented, and in one embodiment, may be manipulated for frame selection. FIGS. 4A and 4B are two examples of these graphical representations. FIG. 4A is a line graph (400) representing the number of views for a frame (402) with respect to a frame number (404). While this example depicts the views for a frame with respect to frame number, various other attributes may be plotted on the line graph in addition to or instead of frame views. For example, volume level or viewing rate may be plotted attributes. Additionally, and as described above, portions of the data may be expanded. For example, the portion containing frames 700-1,000 (406) and the portion containing frames 1,200-1,300 (408) may for instance be of particular interest due to the exceptionally high views of each frame in those portions. Those areas may therefore be expanded to be viewed in greater detail through the various methods as described in FIG. 2. Accordingly, attributes compiled by frame number are displayed on a line graph for viewing and navigation.

FIG. 4B is a histogram (410) depicting an alternative layout for displaying the data as shown in FIG. 4A. In this example, the histogram (410) summarizes the data of FIG. 4A by grouping frame numbers between various ranges to depict data spikes. For example, the data spike between frames 700-1,000 (406) and frames 1,200-1,300 (408) are depicted in histogram bars (412) and (416), respectively. While FIGS. 4A and 4B depict a line graph (400) and a histogram (410) respectively, various other graphical forms may be implemented for data depiction. Accordingly, data may be graphically displayed in different formats for identification of trends among various attributes.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 5:
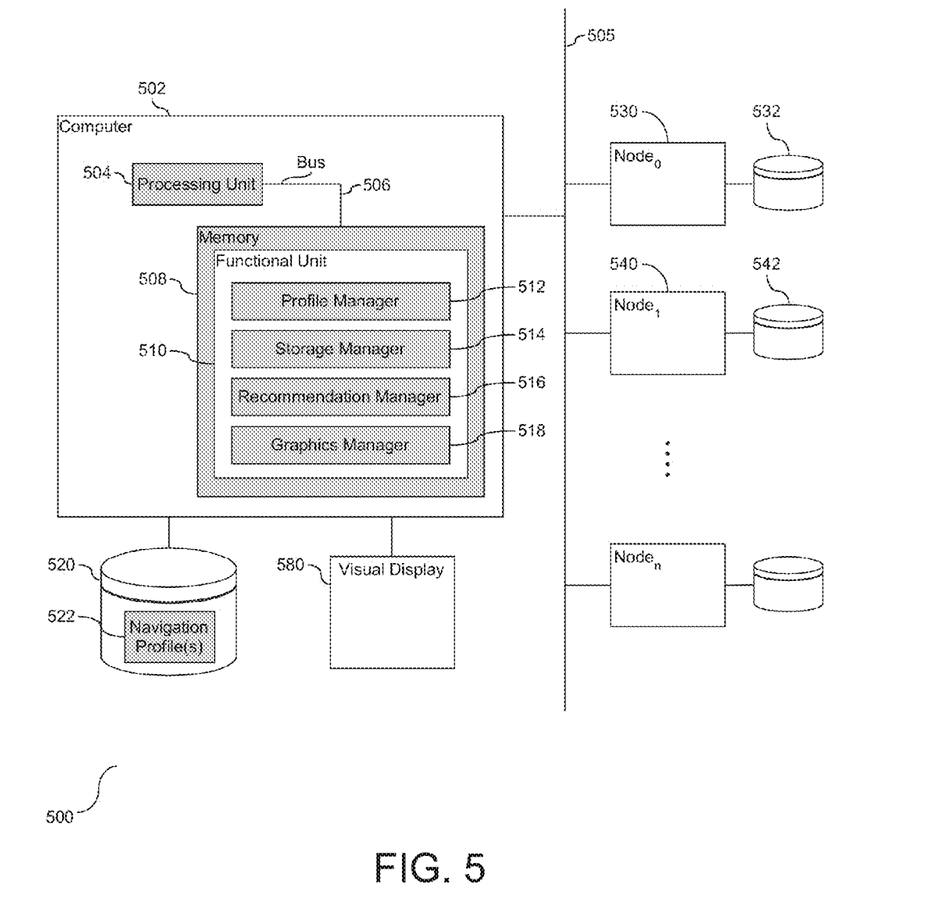
FIG. 5 depicts a block diagram illustrating a system for automated data file recommendation.

The processes shown in FIGS. 1-3 and supported in FIGS. 4 and 5 may be embodied as hardware components. FIG. 5 is a system (500) for creating a navigation profile, displaying the navigation profile, and tools to support manipulation of the data through the graphical representation. A computer (502) is shown in communication with data storage (520), with the storage containing one or more navigation profile(s) (522). The computer has a processing unit (504) in communication with memory (508) across a bus (506). The computer (502) may further be in communication with any number of compute nodes across a network (505). In this instance, computer (502) is in communication with node$_0$ (530) and node$_1$ (540), both in communication with local data storage, (532) and (542) respectively. The computer (502) is in communication with a visual display (580). In addition, computer (502) includes a functional unit (510) having tools embedded therewith. The tools include but are not limited to, a profile manager (512), a storage manager (514), and a recommendation manager (516). In one embodiment, a graphics manager (518) is also provided as one of the tools supported by the functional unit (510).

The profile manager (512) functions to capture a navigation profile (522) of a viewed file. The navigation profile (522), which is a collection of data with information regarding various attributes of viewed frames, portrays or is compiled to portray a viewing pattern of the data file. An example of such an attribute includes whether a frame has been subject to viewing or omitted from viewing. The navigation profile (522) may be a collection of data from a single viewing or multiple viewings of the file. Once captured, the navigation profile (522) is stored in data storage (520) by a storage manager (514) in communication with the profile manager (512). The navigation profile may be stored locally in data storage (520) or in remote data storage (not shown) across a network (505). In one embodiment, the storage manager (514) aggregates a plurality of stored navigation profiles (522) for one or more accessed or viewed files. Accordingly, the profile manager (512) captures any number of navigation profiles (522) which are subsequently stored by the storage manager (514).

The recommendation manager (516) is provided in communication with the storage manager (514). The recommendation manager (516) functions to support selection of a portion of the data file for a second viewing based on the one or more captured and stored navigation profile(s) (522). Where multiple navigation profiles (522) are aggregated in storage, the recommendation manager (516) recommends one or more frames or selected portions within the file for viewing based on the aggregation. In one embodiment, a graphics manager (518) is further provided to graphically represent the aggregated profiles (522). In one embodiment, the graphics manager (518) displays a graphical representation that captures a frequency of frames viewed in a data file based upon the aggregation of captured profiles. The graphics manger (518), as described in further detail in FIG. 2, may display all or only a portion of the aggregated data. Where only a portion of the navigation profiles (522) are displayed, a gesture may be used for selection of a frame within the file. A gesture may also be implemented to expand a portion of viewable area of the graphical representation, or to move between select portions of the file as reflected in the graphical representation(s). Accordingly, the recommendation manager (516) functions to recommend a portion of the file for a second viewing based on the navigation profile(s) (522), and where more than one navigation profile exists, the navigation profiles are graphically represented by the graphics manager (518).

As shown and described above, the recommendation manager (516) assess select portions of a file based on a navigation profile (522). In one embodiment, the navigation profile (522) employs characteristics of users of the file. More specifically, the navigation profile (522) gathers and maintains characteristics of users, such as likes and dislikes. The recommendation manager (516) may recommend one or more portions of the file based on common characteristics of a current user and a prior user. In one embodiment, the recommendation manager (516) provides a recommendation on a combination of the navigation profile (522) and the common characteristics among users of the file. Accordingly, the recommendation manager (516) may employ various characteristics associated with the file as a basis for the recommendation.

As identified above, the profile manager (512), storage manager (514), recommendation manager (516), and graphics manager (518), are shown residing in the functional unit (510). Although in one embodiment, the functional unit (510) and managers (512)-(518) may reside as hardware tools external to the memory (508). In another embodiment, the managers (512)-(518) may be implemented as a combination of hardware and software resources. Similarly, in one embodiment, the managers (512)-(518) may be combined into a single functional item that incorporates the functionality of the separate items. As shown herein, each of the manager(s) (512)-(518) are shown local to one client (502), e.g. compute node. However, in one embodiment they may be collectively or individually distributed across a shared pool of configurable computer resources and function as a unit to enable pattern detection to support one or more recommendations. Accordingly, managers may be implemented as software tools, hardware tools, or a combination of software and hardware tools.

Furthermore, the described features, structures, or characteristics may be combined in any suitable manner in one or more embodiments. Examples of the managers have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit described above in FIG. 5 has been labeled with managers. The managers may be implemented in programmable hardware devices such as field programmable gate arrays, programmable array logic, programmable logic devices, or the like. The manager(s) may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 6:
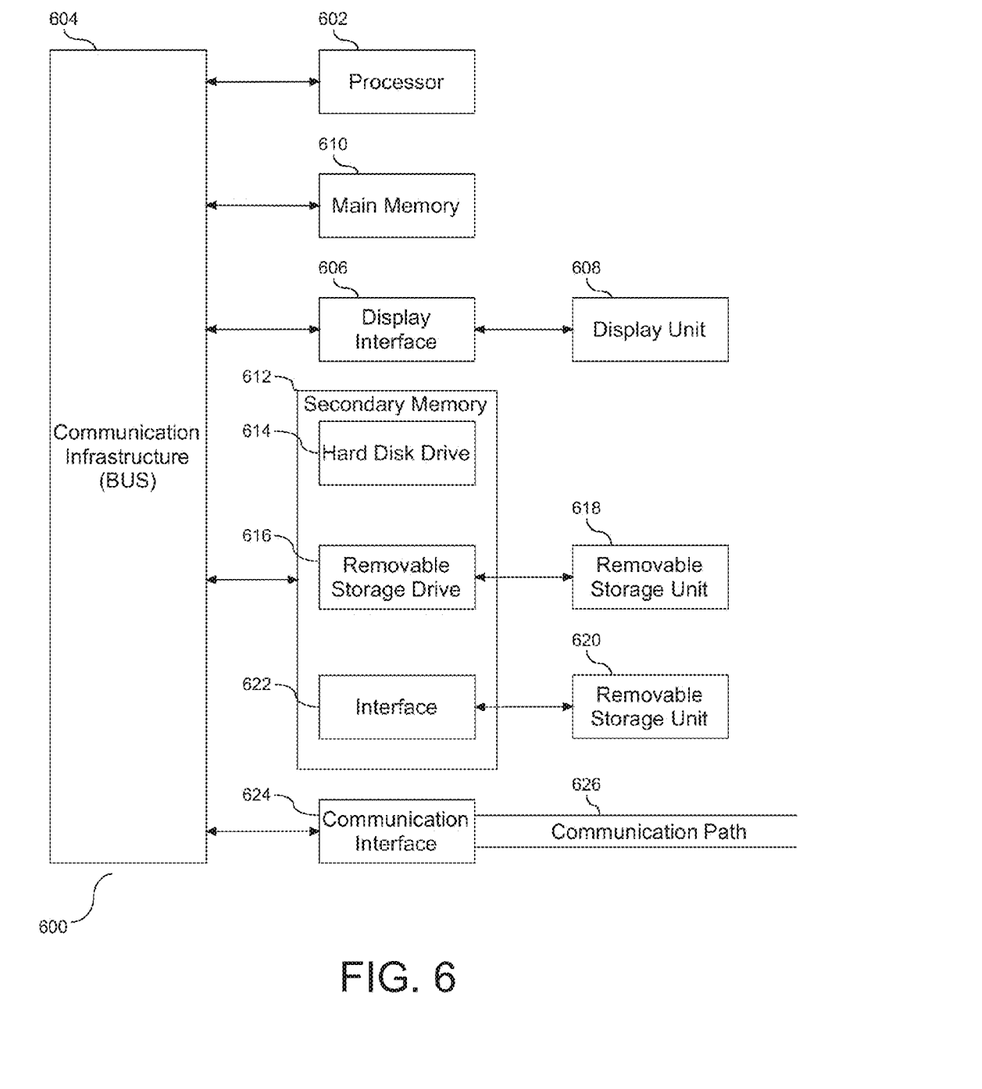
FIG. 6 depicts a block diagram showing a system for implementing an embodiment of the present invention.

Referring now to the block diagram (600) of FIG. 6, additional details are now described with respect to implementing an embodiment of the present invention. The computer system includes one or more processors, such as a processor (602). The processor (602) is connected to a communication infrastructure (604) (e.g., a communications bus, cross-over bar, or network).

The computer system can include a display interface (606) that forwards graphics, text, and other data from the communication infrastructure (604) (or from a frame buffer not shown) for display on a display unit (608). The computer system also includes a main memory (610), preferably random access memory (RAM), and may also include a secondary memory (612). The secondary memory (612) may include, for example, a hard disk drive (614) (or alternative persistent storage device) and/or a removable storage drive (616), representing, for example, a floppy disk drive, a magnetic tape drive, or an optical disk drive. The removable storage drive (616) reads from and/or writes to a removable storage unit (618) in a manner well known to those having ordinary skill in the art. Removable storage unit (618) represents, for example, a floppy disk, a compact disc, a magnetic tape, or an optical disk, etc., which is read by and written to by a removable storage drive (616). As will be appreciated, the removable storage unit (618) includes a computer readable medium having stored therein computer software and/or data.

In alternative embodiments, the secondary memory (612) may include other similar means for allowing computer programs or other instructions to be loaded into the computer system. Such means may include, for example, a removable storage unit (620) and an interface (622). Examples of such means may include a program package and package interface (such as that found in video game devices), a removable memory chip (such as an EPROM, or PROM) and associated socket, and other removable storage units (620) and interfaces (622) which allow software and data to be transferred from the removable storage unit (620) to the computer system.

The computer system may also include a communications interface (624). Communications interface (624) allows software and data to be transferred between the computer system and external devices. Examples of communications interface (624) may include a modem, a network interface (such as an Ethernet card), a communications port, or a PCMCIA slot and card, etc. Software and data transferred via communications interface (624) are in the form of signals which may be, for example, electronic, electromagnetic, optical, or other signals capable of being received by communications interface (624). These signals are provided to communications interface (624) via a communications path (i.e., channel) (626). This communications path (626) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (610) and secondary memory (612), removable storage drive (616), and a hard disk installed in hard disk drive or alternative persistent storage device (614).

Computer programs (also called computer control logic) are stored in main memory (610) and/or secondary memory (612). Computer programs may also be received via a communication interface (624). Such computer programs, when run, enable the computer system to perform the features of the present invention as discussed herein. In particular, the computer programs, when run, enable the processor (602) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. Specifically, the autonomous detection and selection notification for a mobile device is not limited to a mobile phone. Accordingly, the scope of protection of this invention is limited only by the following claims and their equivalents.

We claim:

1. A method comprising:
    capturing a first and second set of data associated with a data file, wherein the first set comprises data corresponding to a viewed portion of the data file by a first entity, and the second set comprises data corresponding to a viewed portion of the data file by a second entity;
    forming a first navigation profile from the first set of data and a second navigation profile from the second set of data, wherein the formed first navigation profile includes a pattern of viewed portions of the first set of data and at least one portion omitted from viewing, and the formed second navigation profile includes a pattern of viewed portions of the second set of data and at least one portion omitted from viewing;
    storing and aggregating the formed navigation profiles;
    identifying a combined viewing pattern from the aggregation, the combined viewing pattern including two or more categories of data;
    recommending a portion of the stored file for a second viewing based on the combined viewing pattern;
    displaying the recommended portion of the stored file on a visual display, the visual display including two or more categories of profile metadata; and
    the visual display supporting gestural navigation within the categories, wherein the gestural navigation supports expansion of the recommended portion of the stored file and comprises navigating between a first graphical representation of:
        a first category with respect to a second category; and
        a second graphical representation of a third category with respect to the second category.

2. The method of claim 1, further comprising selecting a subset of the file for viewing in response to the aggregation of the navigation profiles.

3. The method of claim 1, further comprising graphically representing the aggregation of navigation profiles, including capturing viewing frequency of data within the file based upon the aggregation of captured viewed portions of the file.

4. The method of claim 3, further comprising gesturally selecting at least one subset within the file from the graphical representation.

5. The method of claim 1, further comprising maintaining a profile of one or more viewing preferences based on view characteristics, and recommending at least one portion of the file for viewing based on a common characteristic.

6. The method of claim 1, wherein the data file is a video file and the navigation profile includes data selected from the group consisting of: a skipped portion, a fast-forwarded portion, a re-played portion, a volume increase, a volume decrease, and combinations thereof.

7. The method of claim 1, wherein the gesture is selected from the group consisting of: physical contact between the user and the visual display, and physical contact between a stylus and the visual display.

8. The method of claim 1, wherein the gestural navigation further comprises selecting separate portions of the recommended portion of the stored file.

9. The method of claim 1, wherein the gestural navigation further comprises selecting separate attributes associated with the recommended portion of the stored file.

* * * * *